United States Patent [19]

Wu et al.

[11] Patent Number: 5,233,699
[45] Date of Patent: Aug. 3, 1993

[54] EXPANDED CACHE MEMORY SYSTEM

[75] Inventors: In-Nan Wu, Sunnyvale; James T. Koo, Los Altos Hills; Kong-Yeu Han, Cupertino, all of Calif.

[73] Assignee: Vitelic Corporation, San Jose, Calif.

[21] Appl. No.: 325,554

[22] Filed: Mar. 17, 1989

[51] Int. Cl.⁵ ............................................ G06F 12/00
[52] U.S. Cl. .................................... 395/400; 395/425; 364/DIG. 1; 365/230.02; 365/230.03
[58] Field of Search ... 364/200 MS File, 900 MS File; 365/230.03, 230.02; 375/400, 425

[56] References Cited

U.S. PATENT DOCUMENTS

| | | |
|---|---|---|
| 4,106,090 | 8/1978 | Erickson et al. ................... 364/200 |
| 4,346,437 | 8/1982 | Blahut et al. ...................... 364/200 |
| 4,500,962 | 2/1985 | Lemaire et al. ................... 364/200 |
| 4,587,613 | 5/1986 | Duncan ............................. 364/200 |

Primary Examiner—Joseph L. Dixon
Assistant Examiner—Michael A. Whitfield
Attorney, Agent, or Firm—Flehr, Hohbach, Test, Albritton & Herbert

[57] ABSTRACT

The present invention provides an extended memory capability without requiring a much faster cache memory. This is done by providing address latches on the same chip as the cache memory and providing the most significant address bit from the address latches to be combined with the output of appropriate interface logic. The result of this combination is provided as address control signal along a path to the memory which does not require as long an access time as the rest of the addresses.

13 Claims, 3 Drawing Sheets

EXPANDED CACHE MEMORY SYSTEM

BACKGROUND

The present invention relates to cache memory systems with a capacity exceeding that of their controller, and in particular to an expanded cache memory system for Intel's 82385 cache controller.

A cache controller, such as the 82385, is used to provide a quicker access time than main memory for often used data. Such a system is shown in FIG. 1. A microprocessor, such as the 80386 processor 10, normally accesses a main memory 12 which is typically a very large memory. A smaller cache memory 14 can be accessed more quickly using an intermediate cache controller 16. The 82385 cache controller of Intel is designed to work with a 4K×8 cache memory. Upon a request from the 80386, the cache memory is examined, and if the data is there, it is provided to the 80386. Otherwise, the 80386 will access main memory at a slower speed.

It would be desirable to use the cache controller to access a larger memory, such as an 8K×8 memory or a 128K×8 memory. This could be done with a system such as shown in FIG. 2. A controller 18 is connected through interface logic 20 to a cache memory 22. The interface logic produces more addresses to the memory than are provided by the controller. This can be done through a number of methods which are well known to those of skill in the art. For instance, the appearance of a certain address key could indicate that a different section of memory should be used. Such an address key could be a certain sequence of bits within a certain portion of the address field which is decoded to produce another address bit at the output interface logic. An obvious problem with this type of system is that the interface logic adds an additional time delay to the system, requiring that memory 22 be a faster memory so that the memory access can be done at the same speed as the direct access of FIG. 1. Obviously, such a fast memory will be more expensive and difficult to design.

SUMMARY OF THE INVENTION

The present invention provides an extended memory capability without requiring a much faster cache memory. This is done by providing address latches on the same chip as the cache memory and providing the most significant address bit from the address latches to be combined with the output of appropriate interface logic. The result of this combination is provided as address control signal along a path to the memory which does not require as long an access time as the rest of the addresses.

In one embodiment, this address control signal is provided as the most significant bit of the memory array which is chosen to be a column address. Since a column address need not be present until after the row addresses have started propagating through the array, the delay of the signal through the interface logic does not affect the speed of accessing the memory.

In a second embodiment, the memory itself is arranged as two or more smaller arrays. The data I/O of these arrays are provided through a data multiplexer. The address control signal is then used as a select signal for the multiplexer. Since the multiplexer does not need to be selected until the rest of the addresses have progressed at least partially through the array for a read operation, the delay of the select signal due to the interface logic does not affect the speed of the memory.

Preferably, an exclusive OR gate is provided on the same chip as the memory array and the address latches to enable the most significant bit from the address latches to be combined with an external signal provided by a user's interface logic. This further increases the speed of the interface logic.

The present invention can be expanded to larger memories by using more than one of the most significant bits. The chip can be provided with multiple exclusive OR gates to receive these multiple significant bits. The resulting multiple address control signals can then be provided to more than one column of the memory array or as multiple select inputs to a multiple input data multiplexer.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 3:
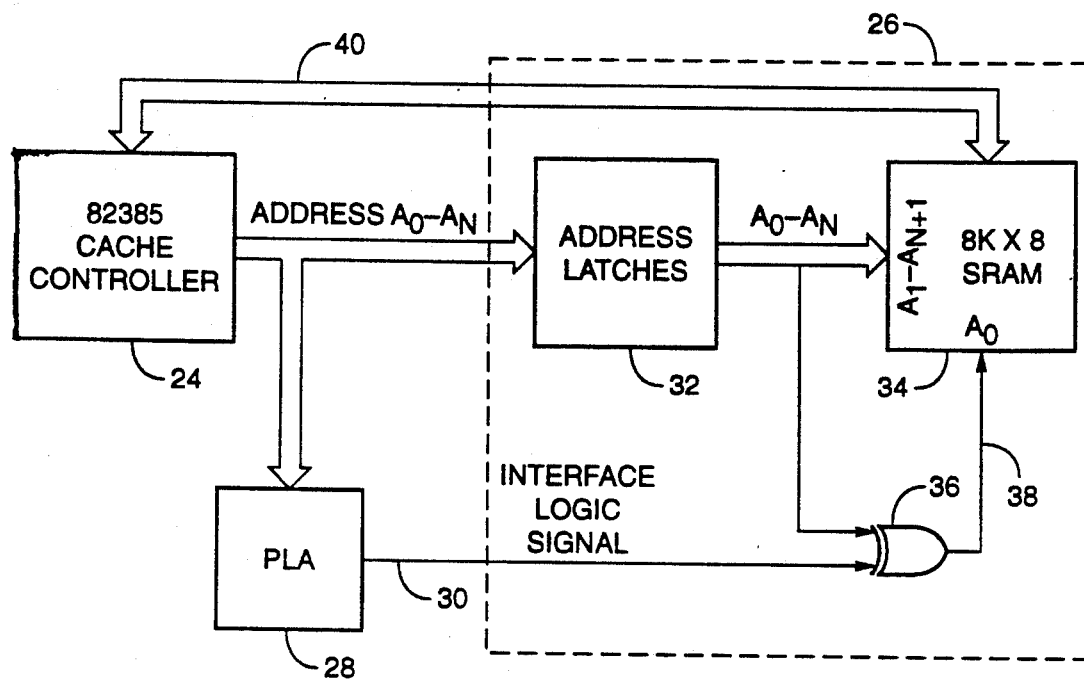
FIG. 3 is a block diagram of a first embodiment of the present invention showing the address control signal being used as a column address.

FIG. 3 shows an 82385 cache controller 24 coupled to a unique chip 26 according to the present invention, as shown by dotted lines. A customer provided programmable logic array (PLA) 28 decodes the addresses from controller 24 and provides them as an interface logic signal input 30 to chip 26. Chip 26 contains address latches 32, an 8K×8 static random access memory (SRAM) 34 and exclusive OR gate 36. The addresses from cache controller 24 are held in latches 32, with the most significant address A0 being provided to exclusive OR gate 36 along with logic signal 30. The output of exclusive OR gate is an address control signal 38 which is provided as address A0, a column address, of array 34. All of the address bits, including A0, are provided to address inputs A1–A(N+1) of the array 34. Thus, array 34 receives one more address input than are provided to address latches 32. Data output would be provided on an output bus 40 back to controller 24.

As can be seen, address A0-8A(N) can be propagating through the address latches and to array 34 while PLA 28 and exclusive OR gate 36 are still decoding the address control signal for line 38. This address control signal is not needed until a later time because it is a column address of array 34.

Figure 4:
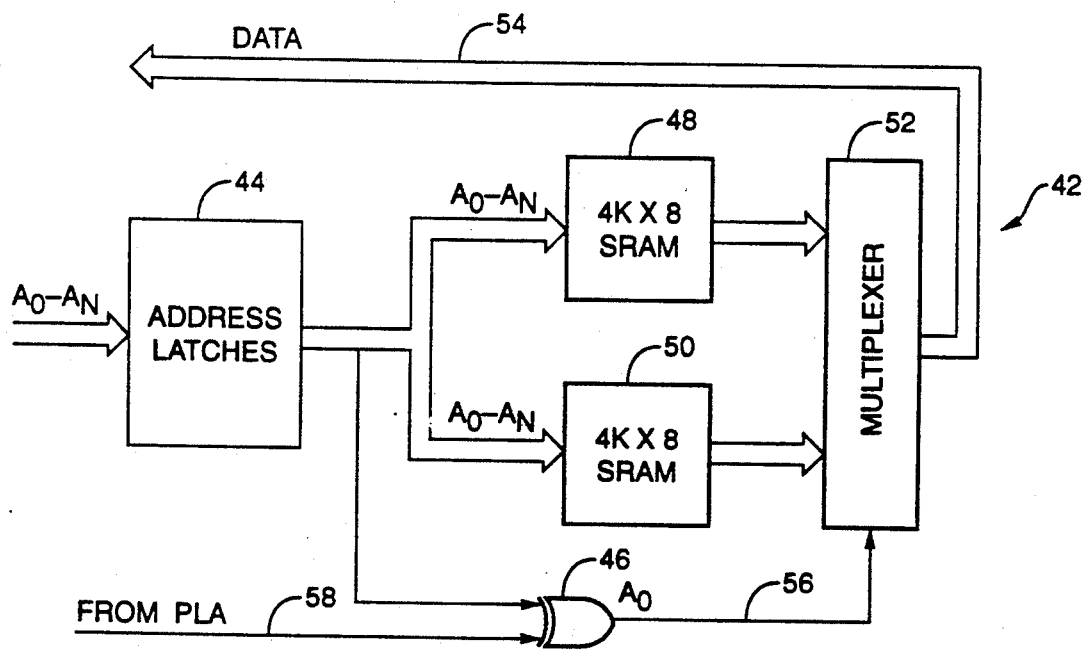
FIG. 4 is a block diagram of a chip according to the present invention using the address control signal as a multiplexer select signal.

FIG. 4 shows an alternate embodiment with an integrated circuit 42 having address latches 44 and an exclusive OR gate 46, similar to FIG. 3. However, the memory array is divided into two smaller arrays 48 and 50 with their data outputs being provided through a multiplexer 52 to a data bus 54. Each of the smaller arrays 48 and 50 are thus accessed by each address sequence, with the address control signal on line 56 being used to select the appropriate block by controlling the select input of multiplexer 52. Thus, the signal on line 56 need not be present until the addresses have already propagated through the arrays and the data outputs are about to be provided to the multiplexer. Accordingly, the delay from the PLA logic on input line 58 does not slow down the accessing of the memory.

Although exclusive OR gate 36 and 46 in FIGS. 3 and 4, respectively, is shown as being on the chip, it could also be provided off the chip in another embodiment. Thus, the most significant address bit from the address latches could be provided to one output pin, with an input pin being used to provide the result of its combination in the exclusive OR gate to either a column address or multiplexer select on the chip.

Figure 5:
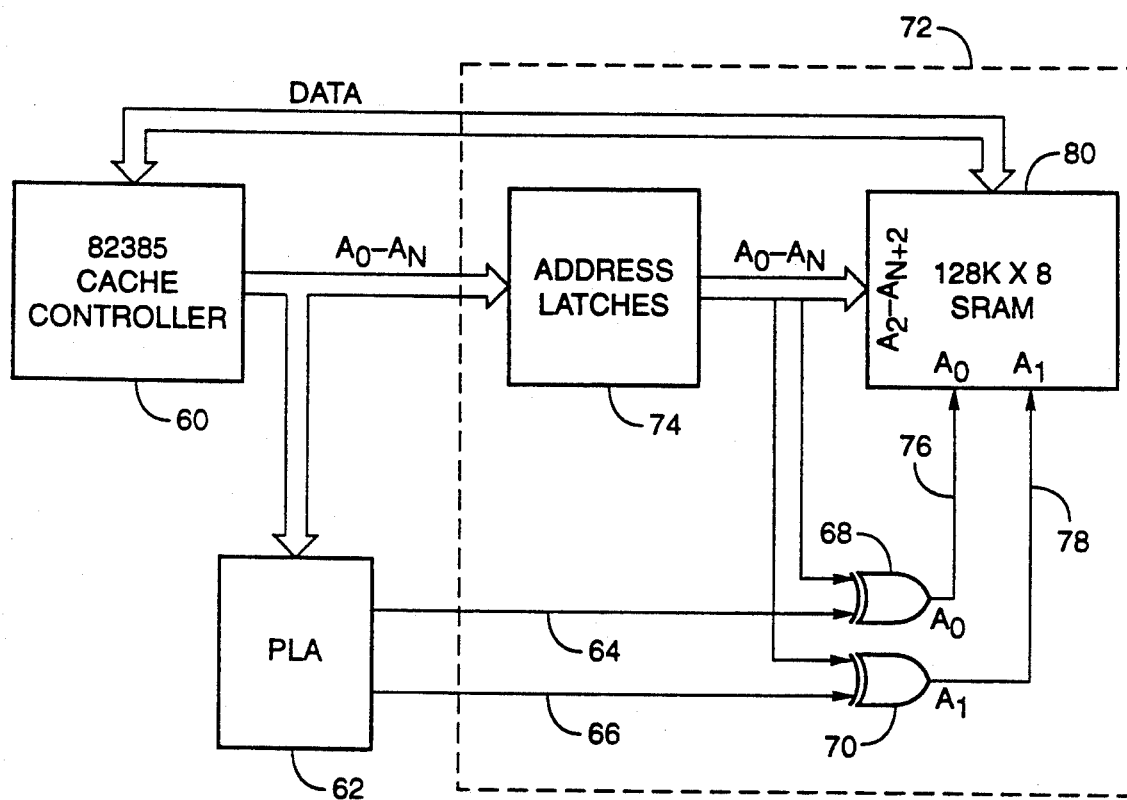
FIG. 5 is a block diagram of an embodiment of the present invention using multiple address control signals.

The present invention can be expanded to more than double the memory by simply increasing the number of address control signals. Such an embodiment is shown in FIG. 5 for a 128K×8 SRAM. As shown in FIG. 5, a cache controller 60 is provided along with a PLA 62. PLA 62 provides two outputs on lines 64 and 66 which are provided to two exclusive OR gates 68 and 70 on a chip 72. These signals are then combined with the two most significant bits from address latch 74 to provide column addresses AO and A1 of the SRAM. The address latch outputs AO-AN are then provided as inputs A2 through A(N+2) to the array.

Alternately, the address control signals on lines 76 and 78 could be provided as multiple select inputs of a multiplexer in the manner shown in FIG. 4, with SRAM array 80 being organized as multiple smaller arrays.

Figure 1:
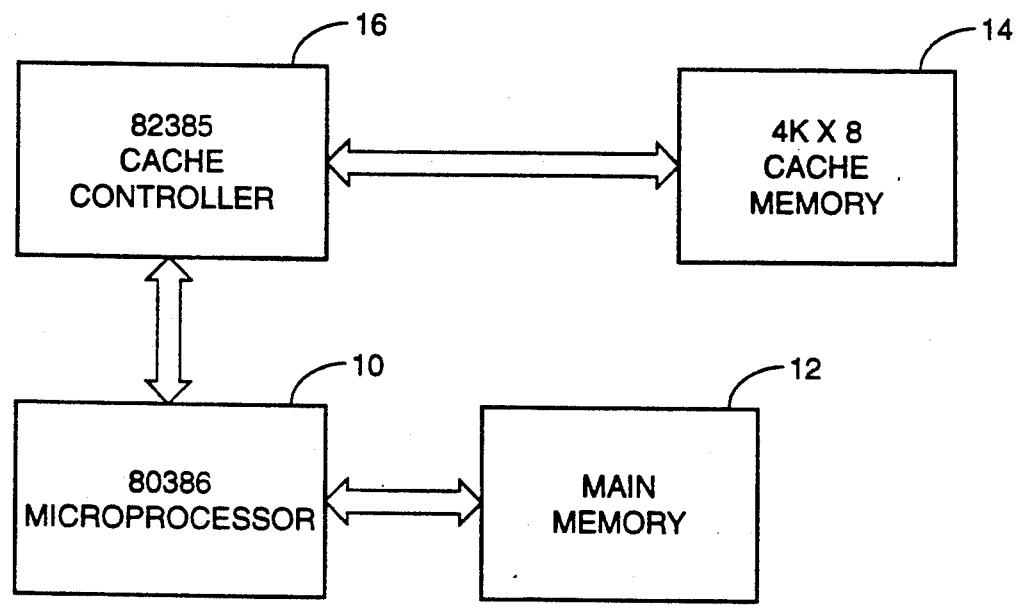
FIG. 1 is a block diagram of a prior art circuit using an 82385 cache controller.
Figure 2:
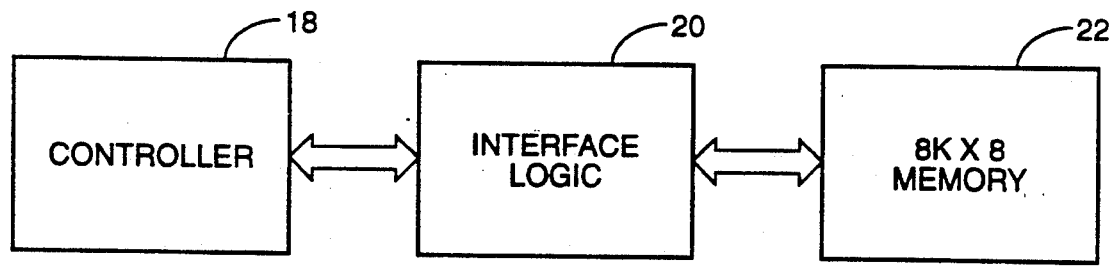
FIG. 2 is a block diagram showing the use of interface logic to provide expanded memory.

The present invention has been designed to give a memory device which has an access time of 35 nanoseconds (ns) with a memory array having an access time of 32-33 ns. If a prior art system such as that shown in FIG. 2 were used, a memory device with 25 ns access time would be needed to overcome the delay added by the interface logic.

The present invention in the embodiment of FIG. 3 takes advantage of the 5-10 ns faster access time for column address bits than for row address bits to enable the use of separate paths for accessing memory. In addition, a 5-6 ns speed improvement is provided by having the exclusive OR gate built on the same chip as the memory array.

As will be understood by those familiar in the art, the present invention may be embodied in other specific forms without departing from the spirit or essential characteristics thereof. For example, a multiple input multiplexer could be used instead of the single multiplexer of FIG. 4 to implement the embodiment of FIG. 5. Accordingly, the disclosure of the preferred embodiments of the present invention is intended to be illustrative, but not limiting, of the scope of the invention which is set forth in the following claims.

What is claimed is:

1. A method for accessing at high speeds a cache memory with a cache controller, the cache memory having a larger number of address inputs than are provided by the cache controller, wherein said cache memory is integrated on a semiconductor chip, said method comprising the steps of
    storing N address bits provided by the cache controller in an address latch that is integrated on said semiconductor chip, and applying to said cache memory said N address bits stored in said address latch;
    receiving from a circuit external to said semiconductor chip at least one interface logic signal;
    logically gating said at least one interface logic signal with at least one of said N address bits stored in said address latch to generate at least one additional address signal; and
    applying said at least one additional address signal to said cache memory.

2. The method of claim 1 wherein said logically gating step comprises performing an exclusive OR function on said at least one interface logic signal and said at least one of said N address bits stored in said address latch.

3. The method of claim 2 wherein said exclusive OR function is accomplished with an exclusive OR gate integrated on said semiconductor chip with said cache memory.

4. The method of claim 1 wherein said at least one stored address bit used in said logically gating step is a most significant address bit.

5. The method of claim 1,
    wherein said step of logically gating includes gating multiple interface logic signals with multiple address inputs stored in the address latch to produce multiple additional address signals; and
    wherein said applying step includes applying the multiple additional address signals to the cache memory as column address signals.

6. The method of claim 5 wherein said step of logically gating includes performing a separate exclusive OR function on each respective interface logic signal and a different respective address bit stored in the address latch.

7. A semiconductor memory chip for use as a cache memory with a cache controller, said semiconductor memory chip comprising:
    a memory array integrated on said semiconductor chip, said memory array having a larger number of address inputs than is provided by the cache controller;
    an address latch integrated on said semiconductor chip for storing address inputs provided by said cache controller and for applying the stored address inputs to said memory array;
    gating means integrated on said semiconductor chip, said gating means including means for receiving at least one logic signal from a circuit external to said semiconductor memory chip and at least one of said stored address inputs from said address latch, said gating means logically gating said at least one logic signal and said at least one stored address input to produce at least one additional address signal; wherein said gating means has an output coupled to said memory array so as to apply said at least one additional address signal to said memory array.

8. The semiconductor memory chip of claim 7, wherein said at least one additional address signal is used as an at least one most significant column address input of said memory array.

9. The semiconductor chip of claim 7, wherein said gating means includes at least one exclusive OR gate integrated on said semiconductor chip, said at least one exclusive OR gate receiving as one input at least one of said stored address inputs and as another input the at least one logic signal, and having the at least one additional address signal as an output.

10. The semiconductor memory chip of claim 7, wherein said memory array includes multiple smaller arrays that generate respective outputs and a multiplexer coupled to said respective outputs of said multiple smaller array, said at least one additional address signal being used as a multiplexer select signal for said multiplexer.

11. A method for accessing at high speeds a cache memory array with a cache controller, the cache memory array having a larger number of inputs than are provided by the cache controller, wherein the cache memory array is integrated on a semiconductor chip, the method comprising the steps of:

providing the cache memory array as multiple respective memory arrays integrated on the semiconductor chip, each addressable by an N bit address input combination;

storing N address inputs provided by the cache controller in an address latch integrated on the semiconductor chip;

receiving from a circuit external to said semiconductor chip at least one interface logic signal;

logically gating the at least one interface logic signal with at least one stored address input bit from the address latch to generate at least one control signal;

during said step of logically gating, applying the N address inputs stored in the address latch to each respective memory array;

in response to the applied address inputs, generating respective outputs from the multiple respective memory arrays;

selecting one of said respective outputs based upon the at least one control signal.

12. The method of claim 11 wherein said step of selecting includes providing the respective memory array outputs as inputs to a multiplexer and providing the at least one control signal to the multiplexer as at least one selection signal.

13. A semiconductor memory chip for use as a cache memory, comprising:

multiple respective memory arrays integrated on the semiconductor chip, each respective memory array addressable by an N bit address input combination; said multiple respective memory arrays producing respective outputs;

an address latch integrated on said semiconductor chip, said address latch storing N address inputs received from a cache controller external to said semiconductor memory chip and providing the N stored address inputs to all of said multiple respective memory arrays;

gating means integrated on said semiconductor chip, said gating means including means for receiving at least one logic signal from a circuit external to said semiconductor memory chip and at least one of said stored address inputs from said address latch, said gating means logically gating said at least one logic signal and said at least one stored address input to produce at least one control signal; and a multiplexer coupled to said respective outputs of said multiple respective memory arrays, said at least one control signal being used as a multiplexer select signal for said multiplexer;

wherein said address latch provides said N stored address inputs to said multiple respective memory arrays while said gating means is producing said at least one control signal.

* * * * *